United States Patent [19]

Yamaguchi

[11] 4,177,451
[45] Dec. 4, 1979

[54] DATA COMMUNICATION SYSTEM

[75] Inventor: Taihei Yamaguchi, Yamato, Japan

[73] Assignee: Panafacom Limited, Japan

[21] Appl. No.: 906,341

[22] Filed: May 16, 1978

Related U.S. Application Data

[63] Continuation-in-part of Ser. No. 692,352, Jun. 3, 1976.

[30] Foreign Application Priority Data

Jun. 10, 1975 [JP] Japan .................................. 50-69906

[51] Int. Cl.² .......................... H04Q 9/00; H04L 5/14; H04J 3/06
[52] U.S. Cl. ............................ 340/147 R; 178/58 A; 179/15 AL
[58] Field of Search ................. 340/147 R, 146.1 BA; 179/15 AL; 178/58 R, 58 A

[56] References Cited

U.S. PATENT DOCUMENTS

| | | | |
|---|---|---|---|
| 3,618,037 | 11/1971 | Wollum | 340/172.5 |
| 3,787,627 | 1/1974 | Abramson et al. | 179/15 AL |
| 3,790,717 | 2/1974 | Abramson et al. | 179/15 AL |
| 3,922,486 | 11/1975 | De Jean | 178/58 R |
| 3,956,589 | 5/1976 | Weathers et al. | 340/146.1 BA |
| 3,979,723 | 9/1976 | Hughes et al. | 178/58 A |

*Primary Examiner*—Donald J. Yusko
*Attorney, Agent, or Firm*—Staas & Halsey

[57] ABSTRACT

Disclosed herein is a data communication system which carries out the transfer of data information. In said system, when one communication control unit is used as a transmitting side, said unit sends control signals, such as a receive command signal, to another communication control unit, and; when said one unit is used as a receiving side, said one unit sends control signals, such as various response signals, to said other communication control unit. In the data communication system according to the present invention, the same control signal has different meanings, depending on whether the communication control unit is used as a transmitting side or as a receiving side.

7 Claims, 6 Drawing Figures

DATA COMMUNICATION SYSTEM

This application is a continuation-in-part application of U.S. application Ser. No. 692,352, filed June 3, 1976.

This invention relates to a data communication system, in particular, to a system which communicates data information in a half duplex manner. In said system, the same control signal is employed when transmitting and receiving but has different meanings, depending on whether said control signal is used as a transmitting side signal or as a receiving side signal. This technique is effective for decreasing the number of control signal lines.

For the purpose of simplifying a half-duplex type data communication system which communicates the data information via a transmission line, there are provided in a conventional system, a data information circuit and a control circuit, which controls the data information, each being provided independently and respectively to an up transmission line and a down transmission line. Control signals which control the transmission and the reception of the information are provided in the form of a receive command signal and a response signal. The receive command signal indicates that the data is sent out and the response signal indicates that the reception of the data is completed.

In the above-mentioned half-duplex type data communication system, one communication control unit sends out the receive command signal and confirms the response signal from the other communication control unit. In other words the data communication is carried out by repeating the sending out of the receive command signal and by confirming the response signal.

Therefore, in the above-mentioned half-duplex type data communication system, when one communication control unit is used as the transmitting side, said unit should sent out the receive command signal to the other communication control unit and when said one communication control unit is used as the receiving side, said one unit should send the response signal to the other unit. The signals which are required by the transmitting side are an inquiry command, a transmission end command and a receive command. The signals which are required by the receiving side are a negative acknowledge response NAK, a reverse interruption response RVI, and an acknowledge response ACK. That is, each unit should provide three kinds of circuits for sending out the command signals and also three kinds of circuits for receiving the response signals. Therefore, twelve communication lines are required between two communication control units for communicating the command signals and the response signals.

An object of the present invention is to provide a data communication system which has less transmission lines than the known system.

Another object of the present invention is to provide a data communication system wherein the same control signal has different meanings depending on whether the communication control unit is operated as the transmitting side or the receiving side.

For achieving above-mentioned objects, the present invention discloses a data communication system wherein, when one communication control unit is used as a transmitting side, said unit sends control signals such as a receive command signal to another communication control unit, and, when said one unit is used as a receiving side, said one unit sends control signals such as various response signals to said other communication control unit. In the data communication system according to the present invention, the same control signal has different meanings depending on whether the communication control unit is used as a transmitting side or as a receiving side.

Further features and advantages of the present invention will be apparent from the ensuing description with reference to the following described accompanying drawings to which, however, the scope of the invention is in no way limited.

Figure 1:
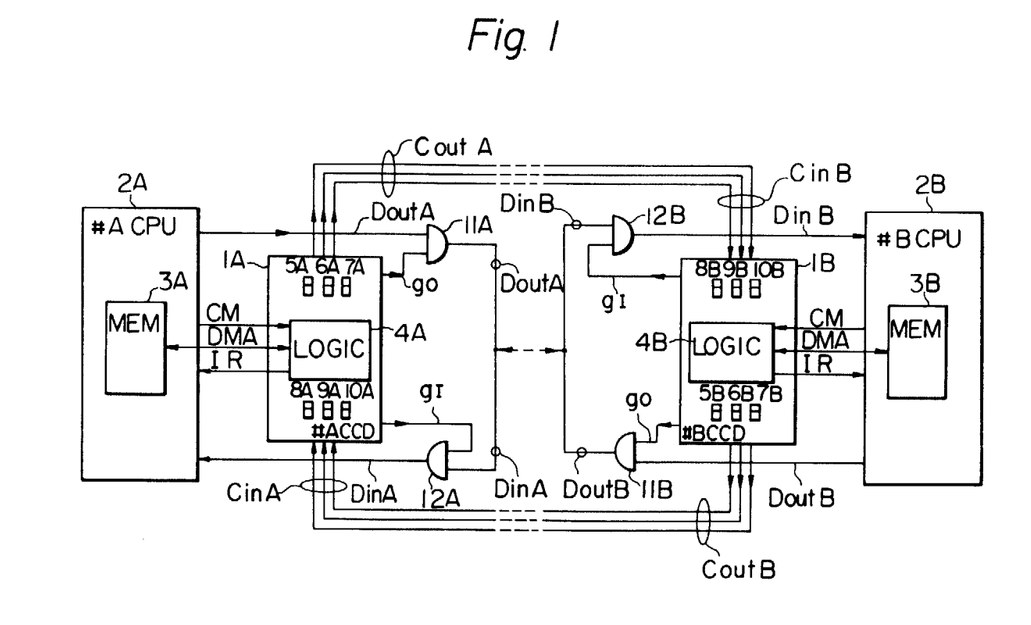
FIGS. 1 and 1a are block diagrams of one embodiment of a data communication system according to the present invention.

Referring to FIGS. 1, 1A and 1B are respectively communication control units; 2A and 2B are host data processors; 3A and 3B are memories; 4A and 4B are hardware logic circuits; 5A and 5B are flip-flop circuits which are set when a first kind of control signal is generated from the communication control units 1A and 1B, respectively; 6A and 6B are flip-flop circuits which are set when a second kind of control signal is generated from the communication control units 1A and 1B, respectively; 7A and 7B are flip-flop circuits which are set when a third kind of control signal is generated from the communication control units 1A and 1B, respectively; 8A and 8B are flip-flop circuits which are set when the communication control units 1A and 1B receive the first kind of control signal, respectively; 9A and 9B are flip-flop circuits which are set when the communication control units 1A and 1B receive the second kind of control signal, respectively; 10A and 10B are flip-flop circuits which are set when the communication control units 1A and 1B receive the third kind of control signal, respectively; 11A, 11B, 12A and 12B are AND circuits, respectively; $D_{out}$ indicates data information which is to be sent; $D_{in}$ indicates data information which is received; $C_{out}$ is a control signal which is to be sent; $C_{in}$ is a control signal which is received; g0 and g1 are gate signals; CM indicates a command; IR indicates an interruption signal for the host data processor, and; DMA shows an access signal for the memory.

Figure 1A:
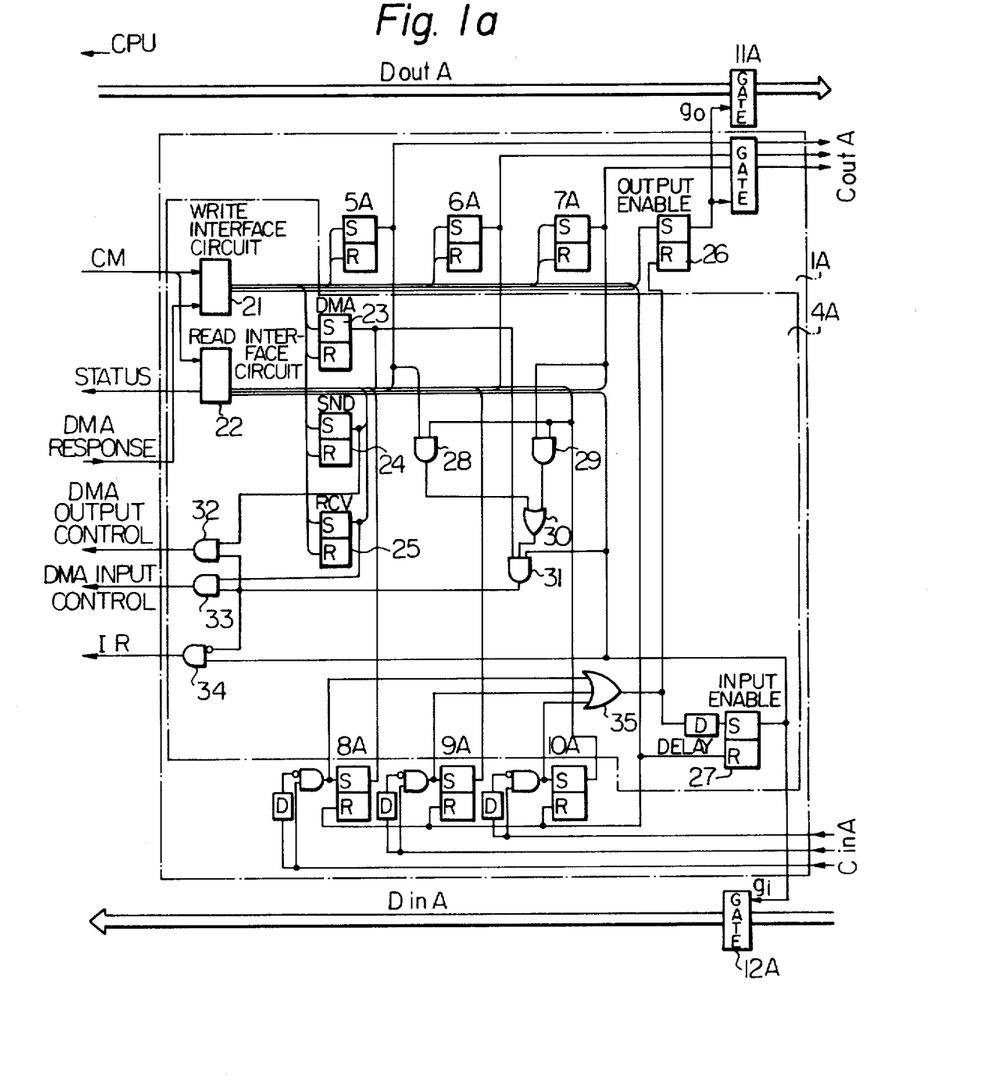

FIG. 1a illustrates in detail a circuit of the communication control unit 1A and the hardware logic circuit 4A. Referring to FIG. 1a, a write interface circuit 21 detects a command CM or a DMA response signal generated in the computer CPU, and generates, in accordance with the content of the command CM or a DMA response signal, a command signal for changing the states of flip-flop circuits which are connected to the write interface circuit 21. A read interface circuit 22 detects the read command CM of the computer CPU and transmits the states of the flip-flop circuits which are connected to the read interface circuit to the computer CPU. A DMA flip-flop circuit 23 selects whether the communication is to be carried out by the interrupt process or by the DMA mode, in accordance with the command of the computer CPU. Referring to FIG. 1a, if the content of the DMA flip-flop circuit 23 is a value "1," when the apparatus, in the transmitting state, sends out the receive command STROBE (7A) and receives the acknowledge response ACK (10A), or sends out the inquiry command ENQ (5A) and receives the acknowledge response ACK (10A), and when the apparatus, in the receiving state, sends out the acknowledge signal ACK (7A) or NAK (5A) and receives the receive command STROBE (10A), the communication is carried out in the DMA mode, and; in the other case, the interruption is caused by the interruption signal IR and the computer CPU controls communication in a program mode. A SND flip-flop circuit 24 and a RCV flip-flop circuit 25 are controlled, in the present embodiment, by the command of the computer CPU, and set the transmitting state and the receiving state of the apparatus. In the initial state, these flip-flop circuits 24, 25 have a value "0" and both flip-flop circuit 24, 25 can not be a value "1" at the same time. An output enable flip-flop circuit 26 is set to the value "1" in accordance with the command of the computer CPU or the DMA response signal, and generates signals $C_{out\,A}$ and $D_{out\,A}$. By receiving the signal $C_{in\,A}$, this output enable flip-flop circuit 26 is reset immediately. An input enable flip-flop 27 is set via a gate 35 by the leading edge of the signal $C_{in\,A}$ and is reset by the command of the CPU or the DMA response signal when the computer reads the signal $D_{in\,A}$ in the program mode or DMA mode. A DMA output control signal is a control signal by which the computer CPU supplies the data to the $D_{out\,A}$ in the DMA mode. A DMA input control signal is a control signal by which the computer CPU reads the data of the signal $D_{in\,A}$ in the DMA mode. A DMA response is a signal which is indicated by the computer CPU. The signal indicates the fact that the output or the input of the data is completed in accordance with the DMA output or input control signal. A STATUS signal is a signal for sending the state of the apparatus for the purpose of carrying out the program mode communication control. Gate circuits 28, 29, 30 and 31 are used for the purpose of controlling the inputs of gates 32, 33 and 34 in accordance with the outputs of flip-flop circuits 5A, 7A 10A, and the input enable flip-flop 27.

In the embodiment of the present invention shown in FIG. 1, the system provides three kinds of control signals. When the communication control unit 1A is used as a transmitting side, the first control signal is used as an inquiry command ENQ for the communication control unit 1B, the second control signal is used as an end of transmission EOT for the communication control unit 1B and the third control signal is used as a receive command STROBE for the communication control unit 1B. When the communication control unit 1A is used as a receiving side, the first control signal is used as a negative acknowledge response NAK for the communication control unit 1B, the second control signal is used as a reverse interruption response RVI for the communication control unit 1B and the third control signal is used as an acknowledge response ACK for the communication control unit 1B.

Next, the function of the system according to FIG. 1 will be explained.

When the communication control unit 1A is used as a transmitting side and the data information is sent from the unit 1A to the unit 1B, the unit 1A receives the command CM from the data processor 2A and sets the flip-flop circuit 5A so that the inquiry command ENQ is sent from the unit 1A to the unit 1B as the control signal $C_{out\,A}$. If necessary, the gate signal gO is set to the logical value "1" so that the data information $D_{out\,A}$ is sent from the unit 1A to the unit 1B via the gate 11A. When the unit 1B receives the inquiry command ENQ from the unit 1A, the unit 1B sets the flip-flop circuit 8B and sets the gate signal gI and the memory access signal DMA to the logical value "1," so that the data information $D_{out\,A}$ sent from the unit 1A, that is, the $D_{in\,B}$ in the unit 1B, is stored via the gate 12B in the memory 3B of the data processor 2B.

Next, when the unit 1B can receive the data information from the unit 1A, said unit 1B sets the flip-flop circuit 7B so that the acknowledge response ACK is sent as the signal $C_{out\,B}$ from the unit 1B to the unit 1A. If necessary, the gate signal gO is made the logical value "1" so that the data information $D_{out\,B}$ is sent from the unit 1B to the unit 1A via the gate 11B.

After the unit 1A receives the acknowledge response ACK from the unit 1B, the unit 1A sets the flip-flop 7A under the control of the hardware logic circuit 4A or the control of the data processor 2A, so that the receive command STROBE is sent, as the signal $C_{out\,A}$, from the unit 1A to the unit 1B. At the same time, the gate signal gO is made the logical value "1" so that the data information $D_{out\,A}$ is sent from the unit 1A to the unit 1B via the gate 11A.

In a similar manner, confirming that the control signal from the unit 1B is received as the acknowledge response ACK, the unit 1A continues to send the receive command STROBE and the data information $D_{out\,A}$ to the unit 1B.

When the unit 1B receives the receive command STROBE from the unit 1A, the unit 1B sets the flip-flop circuit 10B and sets the values of the signals gI and DMA to the logical value "1," so that the data information sent from the unit 1A is stored via the gate 12B in the memory 3B of the data processor 2B. If the received data has been correct, or the unit 1B can receive the next data information, the flip-flop circuit 7B is placed in the set condition, so that the acknowledge response ACK is sent from the unit 1B to the unit 1A as the signal $C_{out\,B}$.

When the transfer of the data is to be completed, the unit 1A sets the flip-flop circuit 6A, so that the end of the transmission command EOT is sent from the unit 1A to the unit 1B as the signal $C_{out\,A}$. If necessary, the signal gO is set to the logical value "1" so that the data information $D_{out\,A}$ is sent from the unit 1A to the unit 1B via the gate 11A. When the unit 1B receives the end of the transmission command EOT from the unit 1A, the unit 1B sets the flip-flop circuit 9B and sets the values of the signal gI and that of the memory access signal DMA to the logical value 1 so that the data information sent from the unit 1A is stored, as the data $D_{in\,B}$ in the unit 1B, in the memory 3B of the data processor 2B. Then, if all of the data which have been sent from the unit 1A with the received command STROBE are correct, said unit 1B sets the flip-flop circuit 7B so that the acknowledge response ACK is sent as the signal $C_{out\,B}$ from the unit 1B to the unit 1A. If necessary at the same time the data information $D_{out\,B}$ is sent from the unit 1B to the unit 1A. Thus, the transfer of the data is completed.

When the unit 1B desires to interrupt the transfer of the data, the unit 1B sets the flip-flop circuit 6B so that the reverse interruption response RVI is sent as the signal $C_{out\,B}$ from the unit 1B to the unit 1A. If necessary, the gate signal gO is made the logical value "1" at the same time, so that the data information $D_{out\,B}$ is sent from the unit 1B to the unit 1A via the gate circuit 11B. When the unit 1A receives the reverse interruption response RVI from the unit 1B, the unit 1A sets the flip-flop circuit 9A and sets the gate signal gI and the memory access signal DMA to the logical value "1," so that the data information sent from the unit 1B is stored via the gate 12A in the memory 3A of the data processor 2A as the data $D_{in\ B}$.

When the unit 1A sends the inquiry command ENQ as the signal $C_{out\ A}$ to the unit 1B and the unit 1B can not receive the data information from the unit 1A, the unit 1B sets the flip-flop circuit 5B, so that the negative acknowledge response NAK is sent from the unit 1B to the unit 1A as the signal $C_{out\ B}$. If necessary, the signal gO is set to the logical value "1" at the same time, so that the data information $D_{out\ B}$ is sent from the unit 1B to the unit 1A via the gate circuit 11B. When the unit 1A receives the negative acknowledge response NAK from the unit 1B, the unit 1A sets the flip-flop circuit 8A and sets the values of the singal gI and the memory access signal DMA to the logical value "1", so that the data information which is sent from the unit 1B is stored as the information $D_{in\ A}$ in the memory 3A of the data processor 2A.

The above explanation is the case where the unit 1A is used as the transmitting side and the unit 1B is used as the receiving side. However, the same explanation is applicable when the unit 1A is used as the receiving side and the unit 1B is used as the transmitting side. The flip-flop circuits 5A, 6A and 7A of the unit 1A correspond to the flip-flop circuit 5B, 6B and 7B of the unit 1B. When the unit 1A is used as the receiving sde, the flip-flop 5A is set so as to send the negative acknowledge response NAK to the unit 1B, flip-flop 6A is set so as to send the reversible interruption response RVI to the unit 1B, and the flip-flop 7A is set so as to send the acknowledge response ACK to the unit 1B. When the unit 1B is used as the transmitting side, the flip-flop 5B is set so as to send the inquiry command ENQ to the unit 1A, the flip-flop 6B is set so as to send the end of the transmission EOT to the unit 1A, and the flip-flop 7B is set so as to send the receive command STROBE to the unit 1A.

As mentioned above, the control signals have different meanings depending on whether the unit 1A (or 1B) is used as the transmitting side or the receiving side. The first control signal which is generated by setting the flip-flop circuit 5A (or 5B) is used as the inquiry command ENQ or as the negative acknowledge response NAK; the second control signal which is generated by setting the flip-flop circuit 6A (or 6B) is used as the end of the transmission EOT or as the reverse interruption response RVI; and the third control signal which is generated by setting the flip-flop circuit 7A (or 7B) is used as the receive command STROBE or as the acknowledge response ACK. The manner in which these control signals are used depends upon whether the unit 1A (or 1B) is used as the transmitting side or the receiving side.

Figure 2A:
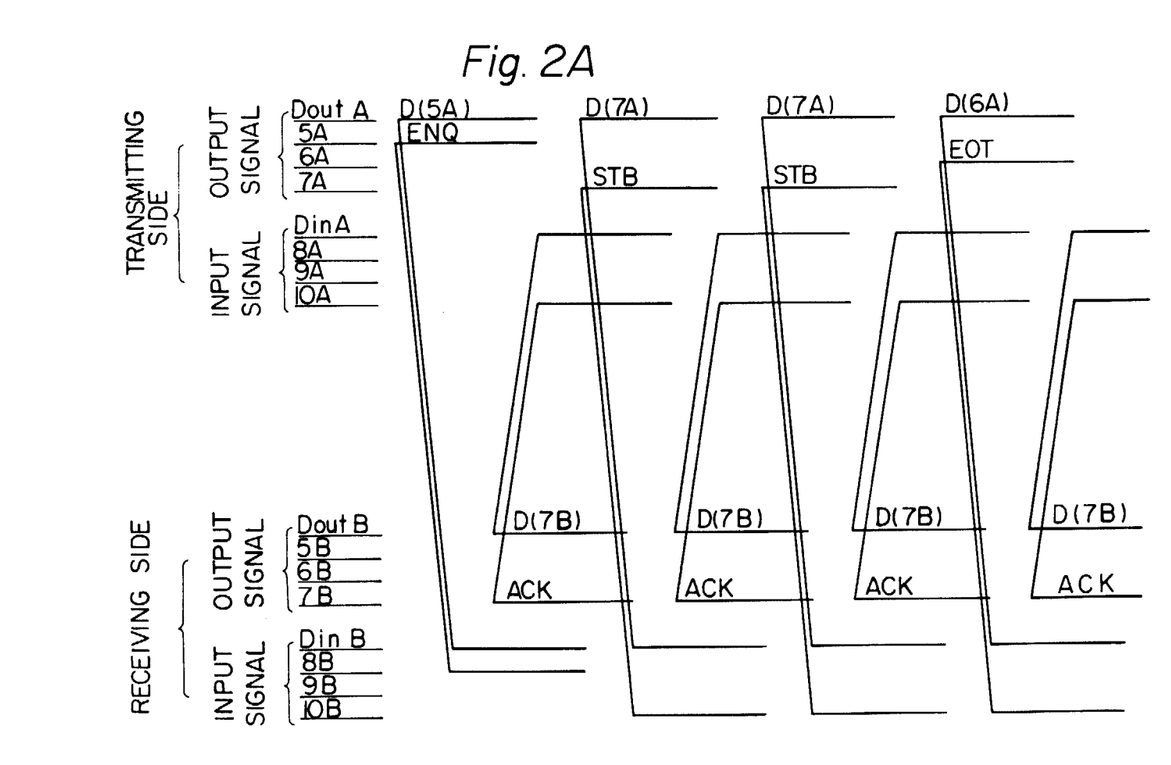
FIGS. 2A through 2D are a sequence of diagrams of the control signals which are used in the block diagram shown in FIG. 1.
Figure 2B:
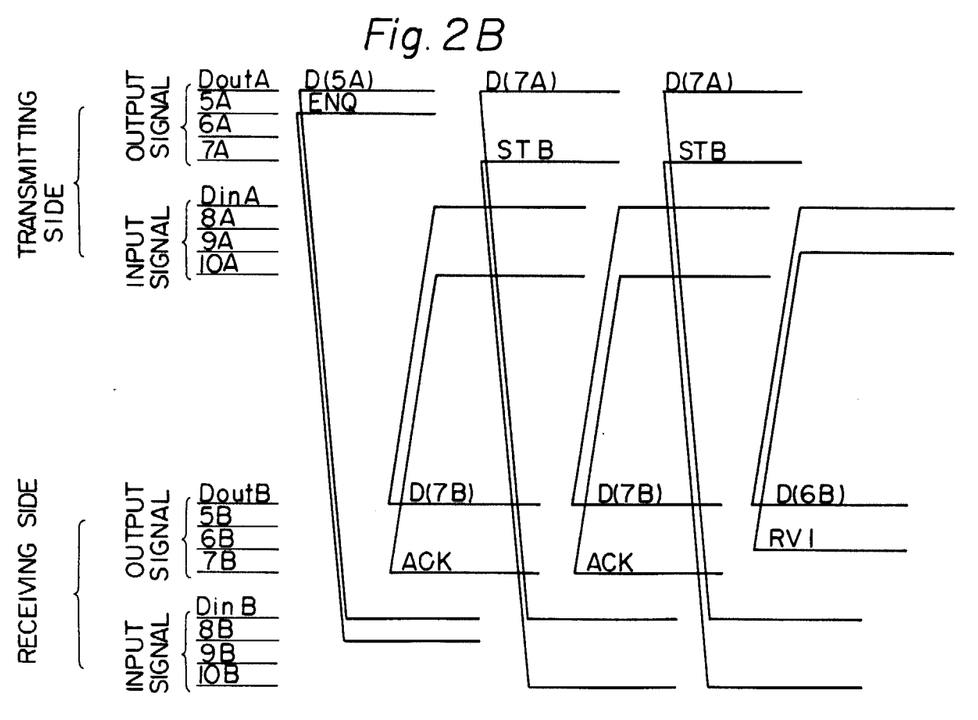
Figure 2C:
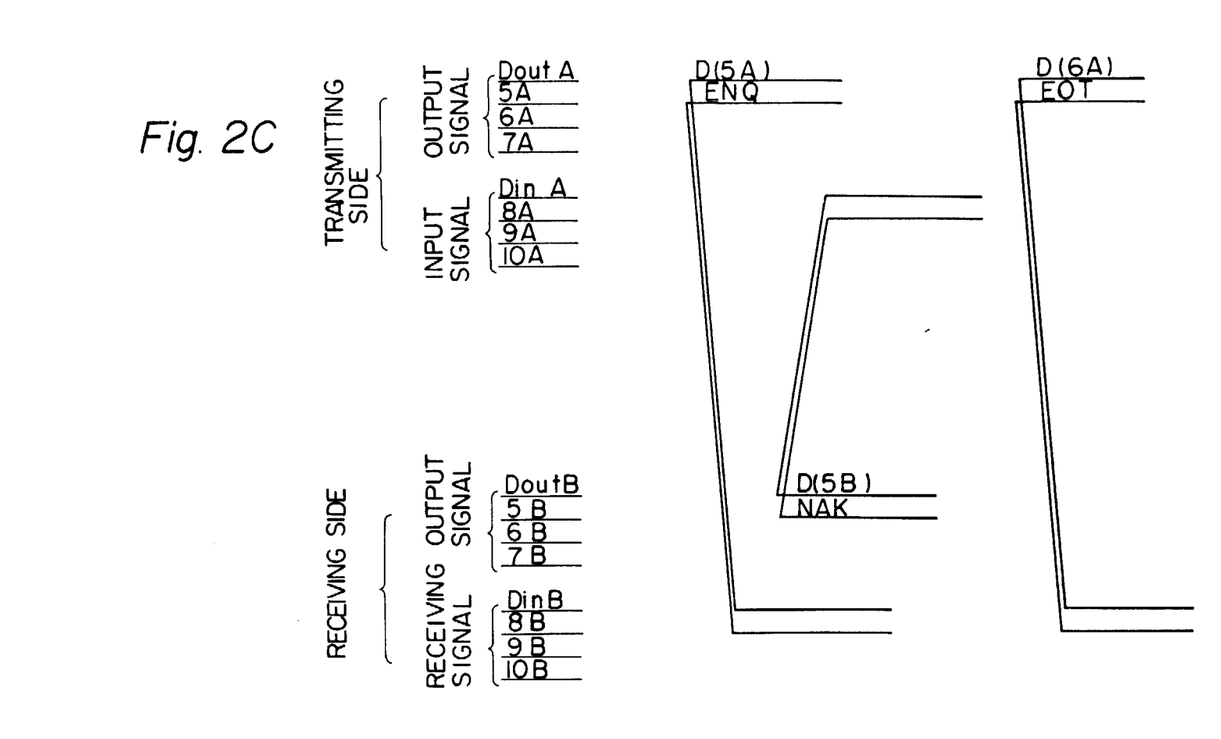

FIGURES 2A through 2C show the time chart of the above-mentioned data transfer system. FIG.2A shows the time chart where the acknowledge response is sent from the unit 1B to the unit 1A, FIG. 2B shows the time chart where the reverse interruption response RVI is sent from the unit 1B to the unit 1A, and FIG. 2C shows the time chart where the negative acknowledge response NAK is sent from the unit 1B to the unit 1A.

In the above-mentioned explanation, we assumed that the symbol "A" indicates a transmitting side and the symbol "B" indicates a receiving side. Whether the communication control apparatus is in the transmitting state or in the receiving state can be judged as follows. When the apparatus in the initial state sends the ENQ signal, the apparatus actuates in the transmitting state. When the apparatus in the transmitting state sends the end of transmission EOT and said apparatus receives the acknowledge response ACK from a partner, or when said apparatus receives the reverse interruption response RVI from the partner and said apparatus sends out the receive command STROBE (the acknowledge response to the reverse interruption response RVI), said apparatus returns to the initial state from the transmitting state. When the apparatus in the initial state receives the inquiry command ENQ, the apparatus actuates in the receiving state.

When the apparatus in the receiving state receives the transmission EOT from the partner and said apparatus sends out the acknowledge response ACK, or when said apparatus sends out the reverse interuption command RVI and said apparatus receives the receive command STROBE (the acknowledge response to the reverse interruption response RVI), said apparatus returns to the initial state from the receiving state. The apparatus in the initial state neglects all received signals except for the inquiry command ENQ.

Figure 2D:
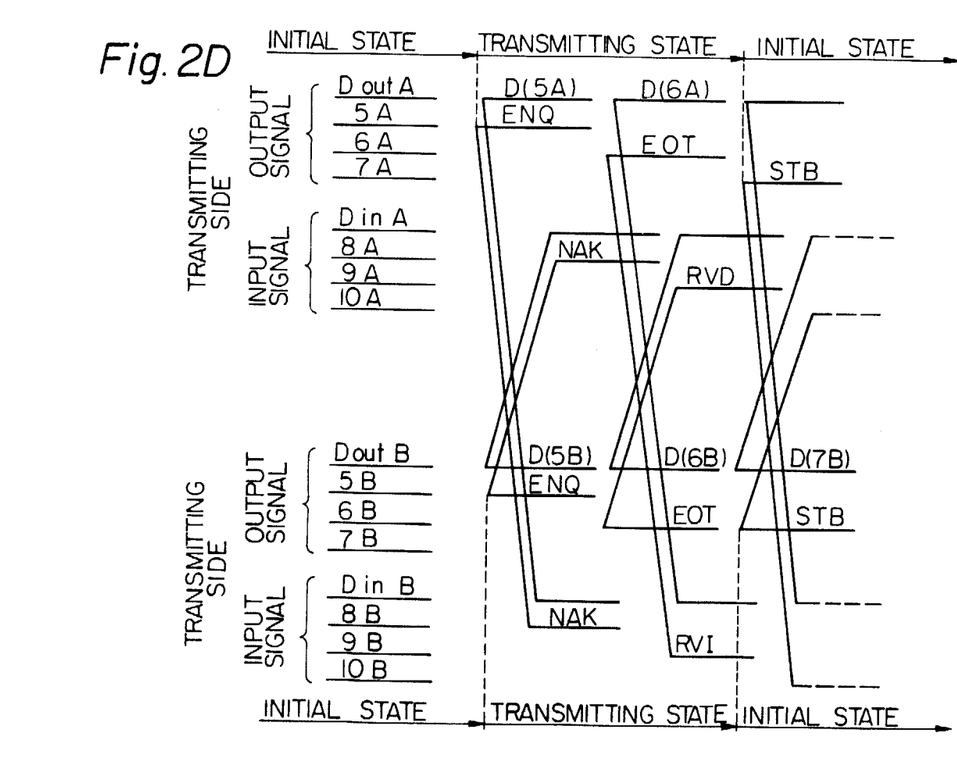

When communication is carried out between two apparatus as mentioned above, one apparatus serves as the transmitting side and the other apparatus serves as the receiving side, and the data are transferred from the transmitting side to the receiving side. However, when both apparatus send out the inquiry command ENQ at the same time, both apparatus are placed in the transmitting state. In this case, both apparatus read the inquiry command ENQ from the partner as the negative acknowledge response NAK, read the transmission EOT from the partner as the reverse interruption response RVI, neglect the receive command STROBE from the partner and avoid communication with each other (FIG. 2D). This function can be obtained by using the same signals with respect to the signals ENQ and NAK, the signals EOT and RVI and the signals STROBE and ACK and by changing the meaning of the signals at the apparatus in the transmitting side and the receiving side.

Further, in FIG. 2D, each apparatus is placed in the transmitting state when said apparatus sends out the inquiry command ENQ. When the apparatus receives the negative acknowledge response NAK, said apparatus sends out the end of transmission EOT for the purpose of the finishing the communication. When said apparatus receives the reverse interruption response RVI, said apparatus sends out the receive command STROBE to the partner, so that the partner obtains the right of sending, and the apparatus returns to the initial state and waits for the inquiry command ENQ from the partner. When the apparatus does not receive the inquiry command ENQ within a predetermined time, said apparatus can be placed in the transmitting state by sending the inquiry command ENQ and communication is effected again.

In the above-mentioned system shown in FIG. 1, the data information $D_{out\ A}$ (or $D_{out\ B}$) which is sent with the receive command STROBE is conventional data to be transferred. However, the data information $D_{out\ A}$ (or $D_{out\ B}$) which is sent with the inquiry command ENQ, the end of the transmission EOT, the negative acknowledge response NAK, the reverse interruption response RVI, or the acknowledge response ACK is information for supplementing the respective command or response.

Next, we, the logic circuits 4A and 4B, which are respectively constituted by the wired logic of each of the communication control circuits 1A and 1B, respectively, will be explained.

(a) The logic circuit 4A (or 4B) determines, by receiving the command CM from the data processor 2A (or 2B), what kind of the control signal should be generated, and set the flip-flop 5A, 6A or 7A (or 5B, 6B or 7B) so as to send the control signal which corresponds to the set flip-flop. If necessary, the logic circuit 4A (or 4B) sets the gate signal gO to the logical value "1" at the same time, so as to send the data information $D_{out\ A}$ (or $D_{out\ B}$) to the unit 1B (or 1A).

(b) When the unit 1A (or unit 1B) receives the control signal $C_{in\ A}$ (or $C_{in\ B}$) from the other unit 1B (or unit 1A), the unit 1A (or the unit 1B) immediately and unconditionally sets the signal gO to a logical value "O" and the signals DMA and gI to the logical value "1" so that the data information $D_{in\ A}$ (or $D_{in\ B}$) is stored in the memory 3A (or 3B).

(c) In accordance with which flip-flop circuit among 5A, 6A and 7A (or 5B, 6B and 7B) is set and in accordance with which flip-flop circuit among 8A, 9A and 10A (or 8B, 9B and 10B) is set, the logic circuit 4A (or 4B) determines whether the next control signal is to be generated in the circuit 4A (or 4B) or left to the data processor 2A (or 2B), and stops sending the control signal. When the next control signal is to be generated by the logic circuit, the next control signal is determined depending on the state of the logic in the circuit.

(d) When the generation of the next control signal is left to the host data processor 2A (or 2B), the logic circuit 4A (or 4B) generates the signal IR so as to interrupt said host data processor 2A (or 2B), and then awaits the command CM from said processor 2A (or 2B).

(e) When the generation of the next control signal is decided in the logic circuit, if necessary only the data information $D_{out\ A}$ (or $D_{out\ B}$) is contained in the signal IR sent to the data processor 2A (or 2B). When the data information $D_{out\ A}$ (or $D_{out\ B}$) is completely arranged in the data processor 2A (or 2B), the logic circuit 4A (or 4B) sets one of the flip-flop circuits of 5A, 6A and 7A (or 5B, 6B and 7B) and sets the signal gI to the logical value "0" and the signal gO to the logical value "1" so that the above-mentioned process (b) is carried out.

In the system shown in FIG. 1, each of the AND circuits 11A, 12A (or 11B, 12B) is used as a gate circuit for te data information, and each also constitutes an input and output interface circuit.

As mentioned above, according to the present invention, for example, only three control signals are needed to effect the fundamental functions which are required for the usual communication system. That is, in said communication system, nine conditions exist in the transmitting side and the receiving side depending on the control signals which are sent from the communication control unit, and on the received control signals which respond to said sent control signal and which are received by said unit. These nine conditions can include all the control conditions which occur in the usual communication system. The information which indicates the status of the units 1A or 1B, the information which indicates the quantity, the character or the processing method of the transfer data, or the information which indicates whether the received information is acceptable or not can be written in the data output $D_{out\ A}$ (or $D_{out\ B}$) which is sent with the above-mentioned control signal. Therefore the conventional signal lines which are required for sending the above-mentioned information can be omitted, and the complexity of combining the above-mentioned information with the usual transfer data can be avoided.

Further, a simple control sequence which occurs in the communication control sequence can be determined in each communication control unit 1A or 1B independently and a complex control sequence which seldom occurs in the communication control sequence can be left to the host data processor 2A or 2B. Therefore, the functions of the communication control unit can be simplified and the required capacity of the host data processor can be decreased.

Further, in the above-described invention, each signal is sent in the form of a direct current signal of the base band, and this signal is continued until a response is received. In the receiving side, the leading edge of the control signal is detected. However, the gist of the present invention is not changed if a signal having a constant width or a signal which is modulated is used as these signals.

What is claimed is:

1. A data communication system for transmitting and receiving data information comprising:
at least first communication control unit which sends control signals as control command signals when said one communication control unit is used as a transmitting side and which sends said control signals as various response signals when said first communication control unit is used as a receiving side, and;
second communication control unit which receives said control signals as said control command signals when said second communication control unit is used as a receiving side, and which receives said control signals as said various response signals when said second communication control unit is used as a transmitting side;
a plurality of lines for said data information, and, different plurality of lines for said control signals, which connect said first communication control unit and said second communication control unit in said system each respective communication control unit including respective first means for defining said control signals in accordance with a first set of meanings, including use as an inquiry command, and end-of-transmission command, and a receive command when said each respective communication control unit is used as the transmitting side, and each respective communication control unit including respective second means for defining said control signals in accordance with a second set of meanings, including use as a negative acknowledge response, a reverse interruption response, and an acknowledge response when said each respective communication control unit is used as the receiving side,
each respective communication control unit including respective logic circuit means, responsive to the use of said each respective communication control unit as a transmitting or receiving side and to said control signals, for determining which of said first and second sets of meanings to attach to said control signals.

2. A data communication system according to claim 1, wherein information which supplements the meaning of said control signals is sent with said control signals.

3. A data communication system according to claim 1, wherein a host data processor is connected to each of said communication control units, wherein said logic circuit of each respective communication control unit decides, in accordance with said control signals which are received, whether the next control signal to be sent is to be generated by said respective communication control unit or by said host data processor connected thereto.

4. A half-duplex data communications system comprising, in combination:
- a transmission line including a data information circuit and a control information circuit;
- first information means connected to said transmission line and having a transmitting mode for providing data information to be transmitted over said data information circuit and having a receiving mode for receiving data information received over said data information circuit;
- second information means connected to said transmission line and having a transmitting mode for providing data information to be transmitted over said data information circuit and having a receiving mode for receiving data information received over said data information circuit;
- first control means connected to said transmission line and operatively associated with said first information means for generating and receiving, over said control information circuit, control signals which have a first meaning including use as an inquiry command, an end-of-transmission command, and a receive command in said transmitting mode, and a second meaning including use as a negative acknowledge response, a reverse interruption response, and an acknowledge response in said receiving mode; and
- second control means connected to said transmission line and operatively associated with said second information means for generating and receiving, over said control information circuit, control signals which have said first meaning in said transmitting mode and said second meaning in said receiving mode;
- said first and second control means each selectively generating respective control signals, and being responsive to respective received control signals, so as to control the transmission and reception of said data information by said first information means and said second information means, respectively.

5. A half-duplex communications system according to claim 4 wherein said first and second control means each includes a plurality of flip-flop circuits, one for each control signal to be generated; a second plurality of flip-flop circuits, one for each control signal to be received, and; a logic circuit connected to said respective information means with which said respective control means is operatively associated for transmitting additional control signals thereto and for receiving further control signals therefrom, said logic circuit being connected to said control information circuit and operatively associated with said first and second plurality of flip-flop circuits so as to selectively apply set and reset signals to said first and second plurality of flip-flop circuits in response to said controls signals received from said control information circuit and said further control signals received from said respective information means.

6. A half-duplex communications system according to claim 4 including first gate means connected between said first information means and said data information circuit, connected to said first control means, and responsive to a first enabling signal received from said first control means, for causing the transmission of said data information from said first information means to said data information circuit, and; second gate means connected between said data information circuit and said first information means, connected to said first control means, and responsive to a second enabling signal received from said first control means, for causing the transmission of said data information from said data information circuit to said first information means.

7. A half-duplex communications system according to claim 4 including first gate means connected between said second information means and said data infromation circuit, connected to said second control means, and responsive to a first enabling signal received from said second control means, for causing the transmission of the data information from said second information means to said data information circuit, and; second gate means connected between said data information circuit and said second information means, connected to said second control means, and responsive to a second enabling signal received from said second control means, for causing the transmission of said data information from said data information circuit to said second information means.

* * * * *